United States Patent
Jung et al.

(10) Patent No.: US 10,897,781 B2
(45) Date of Patent: *Jan. 19, 2021

(54) METHOD AND APPARATUS FOR SYSTEM ACCESS IN SYSTEM USING BEAMFORMING

(71) Applicant: Samsung Electronics Co., Ltd., Suwon-si (KR)

(72) Inventors: Jungsoo Jung, Seongnam-si (KR); Jonghyung Kwun, Seoul (KR); Taeyoung Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/051,998

(22) Filed: Aug. 1, 2018

(65) Prior Publication Data

US 2018/0343680 A1   Nov. 29, 2018

Related U.S. Application Data

(63) Continuation of application No. 15/499,207, filed on Apr. 27, 2017, now Pat. No. 10,064,219, which is a
(Continued)

(30) Foreign Application Priority Data

Aug. 17, 2012 (KR) .................. 10-2012-0089949

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0617* (2013.01); *H04L 5/0023* (2013.01);
(Continued)

(58) Field of Classification Search
CPC .......... H04W 74/0833; H04W 72/042; H04W 72/04; H04W 56/001; H04W 74/00;
(Continued)

(56) References Cited

U.S. PATENT DOCUMENTS

| 5,907,816 A | 5/1999 | Newman et al. |
| 2003/0076812 A1 | 4/2003 | Benedittis |

(Continued)

FOREIGN PATENT DOCUMENTS

| CN | 1852048 A | 10/2006 |
| CN | 101355380 A | 1/2009 |

(Continued)

OTHER PUBLICATIONS

3GPP: 3rd Generation Partnership Project; Technical Specification Group Radio Access Network; Evolved Universal Terrestrial Radio Access (E-UTRA); Medium Access Control (MAC) protocol specification (Release 8), 3GPP Draft; 36321-8C0, 3rd Generation Partnership Pr0ject (3GPP), Mobile Competence Centre ; 650, Route Des Lucioles ; F-06921 Sophia-Antipolis Cedex ; France, Mar. 15, 2012, XP050601447.
(Continued)

*Primary Examiner* — Kiet Tang
(74) *Attorney, Agent, or Firm* — Jefferson IP Law, LLP

(57) ABSTRACT

The present invention relates to an method and an apparatus for upward access, and the method for upward access according to one embodiment of the present invention can comprise the steps of: receiving, from a base station, a synchronization QO channel, a broadcasting control channel and a secondary reference signal; selecting a transmission beam which transmits an upward access signal by using received results from at least one of the synchronization channel, the broadcasting control channel and the QO secondary reference signal; transmitting the upward access
(Continued)

signal by using the selected transmission beam; and receiving, from the base station, an access response and initial set-up information of the control channel as a response for the upward access signal. According to the one embodiment of the present invention, the upward access steps can efficiently perform a beam selection.

20 Claims, 15 Drawing Sheets

Related U.S. Application Data continuation of application No. 14/416,969, filed as application No. PCT/KR2013/007431 on Aug. 19, 2013, now Pat. No. 9,642,165.

(51) Int. Cl.
*H04L 5/00* (2006.01)
*H04W 56/00* (2009.01)
*H04W 72/04* (2009.01)
*H04W 74/00* (2009.01)

(52) U.S. Cl.
CPC ......... *H04W 56/001* (2013.01); *H04W 72/04* (2013.01); *H04W 72/042* (2013.01); *H04L 5/0048* (2013.01); *H04L 5/0053* (2013.01); *H04W 74/00* (2013.01)

(58) Field of Classification Search
CPC ... H04B 7/0617; H04L 5/0048; H04L 5/0023; H04L 5/0053
See application file for complete search history.

(56) References Cited

U.S. PATENT DOCUMENTS

| | | | |
|---|---|---|---|
| 2004/0081073 A1 | 4/2004 | Walton et al. | |
| 2006/0116092 A1 | 6/2006 | Uno et al. | |
| 2007/0263579 A1 | 11/2007 | Ozluturk | |
| 2009/0143073 A1 | 6/2009 | Hovers et al. | |
| 2009/0170514 A1* | 7/2009 | Yokoyama | H04W 72/085 455/436 |
| 2009/0175161 A1 | 7/2009 | Yi et al. | |
| 2009/0190520 A1 | 7/2009 | Hochwald et al. | |
| 2009/0280867 A1 | 11/2009 | Hovers et al. | |
| 2010/0165873 A1 | 7/2010 | Higuchi et al. | |
| 2010/0309877 A1* | 12/2010 | Damnjanovic | H04L 1/0029 370/331 |
| 2011/0007685 A1 | 1/2011 | Ma et al. | |
| 2011/0076955 A1* | 3/2011 | Uno | H04W 16/28 455/63.4 |
| 2011/0194432 A1 | 8/2011 | Kato et al. | |
| 2011/0268049 A1 | 11/2011 | Luo et al. | |
| 2012/0008524 A1* | 1/2012 | Amirijoo | H04W 24/10 370/252 |
| 2012/0014342 A1* | 1/2012 | Suzuki | H04W 56/0005 370/329 |
| 2012/0045996 A1 | 2/2012 | Uno et al. | |
| 2012/0134328 A1 | 5/2012 | Gauvreau et al. | |
| 2012/0182895 A1* | 7/2012 | Jwa | H04W 72/046 370/252 |
| 2013/0094440 A1* | 4/2013 | Moshfeghi | H04W 88/06 370/328 |

FOREIGN PATENT DOCUMENTS

| | | |
|---|---|---|
| CN | 101472346 A | 7/2009 |
| CN | 102067655 A | 5/2011 |
| CN | 102118765 A | 7/2011 |
| CN | 102457324 A | 5/2012 |
| JP | 2006-504335 A | 2/2006 |
| JP | 2006-148928 A | 6/2006 |
| JP | 2009-159214 A | 7/2009 |
| JP | 2009-536806 A | 10/2009 |
| KR | 10-2011-0014187 A | 2/2011 |
| WO | 2007/091546 A1 | 8/2007 |

OTHER PUBLICATIONS

Indian Office Action dated Oct. 23, 2019, issued in Indian Patent Application No. 348/KOLNP/2015.
Chinese Office Action dated Jun. 22, 2020, issued in Chinese Patent Application No. 201810631853.3.

* cited by examiner

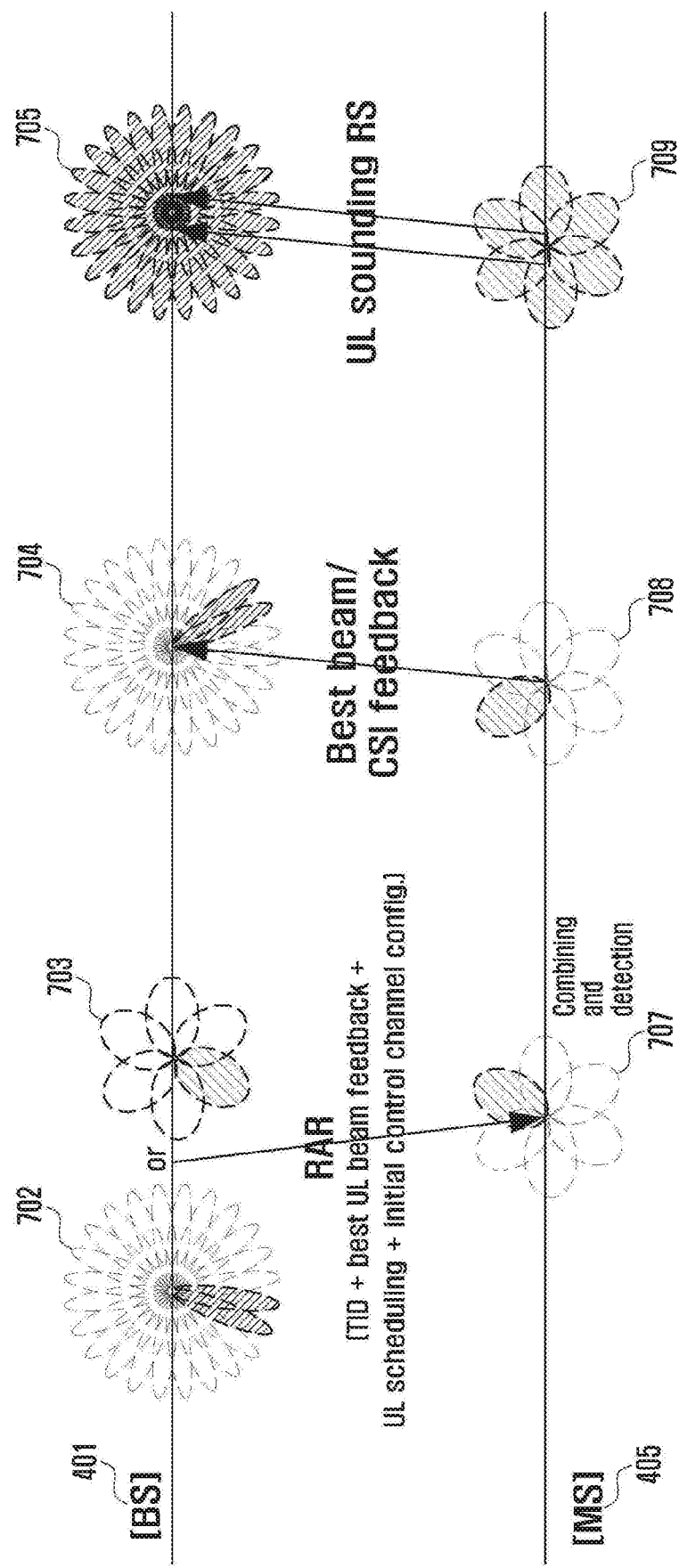

METHOD AND APPARATUS FOR SYSTEM ACCESS IN SYSTEM USING BEAMFORMING

CROSS-REFERENCE TO RELATED APPLICATION(S)

This application is a continuation application of prior application Ser. No. 15/499,207, filed on Apr. 27, 2017, which is a continuation application of prior application Ser. No. 14/416,969, filed on Jan. 23, 2015, which issued as U.S. Pat. No. 9,642,165 on May 2, 2017 and was based on and claimed priority under 35 U.S.C § 119(a) of a Korean patent application number 10-2012-0089949, filed on Aug. 17, 2012 in the Korean Intellectual Property Office, the disclosure of each of which is incorporated by reference herein in its entirety.

TECHNICAL FIELD

The present invention relates to a system access method and apparatus.

BACKGROUND ART

With the advent of smartphones, average data usage amount of mobile communication subscribers increases exponentially and contributes to the strong demand for high data rage. Typically, a high data rate can be achieved in such a way of increasing frequency bandwidth or improving frequency utilization efficiency. In the latter case, the current generation communication technologies have almost reached to the theoretical limit of the frequency utilization efficiency, it is difficult to further increase the frequency utilization efficiency through technical improvement. Therefore, a feasible approach to increase the data rate is to broaden the frequency band for data service. At this time, the available frequency band should be considered. Since the frequency band available for broadband communication in the bandwidth over 1 GHz is limited under the current frequency distribution policy, it is proposed to use the millimeter wave band over 30 GHz for wireless communication. However, such a high-frequency band communication has a drawback in that the signal attenuation increases significantly as the propagation distance increases. In detail, as the frequency increases, the propagation pathloss increases and the propagation distance decreases, resulting in reduction of the service coverage. One of the promising technologies to solve this problem is beamforming which concentrates transmission/reception power to narrow space to increase the transmission/reception efficiency.

FIG. 1 is a diagram illustrating a base station 100 and a mobile station 150 supporting the beamforming with array antennas. Referring to FIG. 1, the base station 100 is capable of transmitting data changing the direction of a downlink transmission beam 120 using the array antennas 110 and 112. Also, the mobile station 150 is capable of receiving data changing the direction of the reception beam 170.

In the communication system using the beamforming technique, the base station 100 and the mobile station 150 select the transmission beam 120 and the reception beam 170 showing the best channel condition among various transmission beam directions and reception beam directions to provide the data service. Such a procedure is applied identically to the uplink channel for transmitting data from the mobile station 150 to the base station 100 as well as the downlink channel for transmitting data from the base station to the mobile station.

It is assumed that a number of transmission beams directions of the base station 100 is N and a number of reception beams directions of the mobile station 150 is M. In this case, the simplest method for selecting the best downlink transmission/reception direction is that the base station 100 makes a trial to transmit a predetermined signal in N individual transmission directions at least M times and the mobile station 150 makes a trial to receive N transmission beams 120 using M reception beams 170.

In this case, the base station 100 has to transmit a specific reference signal at least N×M times and the mobile station 150 has to receive the reference signal N×M times to measure the received signal strength. The mobile station 150 may select the directions showing the highest measurement values as a combination of the best transmission beam direction and reception beam direction. The procedure in which the base station 100 transmits the signal at least one time in every available direction is called beam sweeping, and the procedure in which the mobile station 150 combines the best transmission and reception beam directions is called beam selection. This process of selecting the best downlink transmission beam and the beat downlink reception beam (hereinafter, referred to as Transmission beam and Reception beam) can be applied identically to the uplink transmission procedure for transmitting data from the mobiles station 150 to the base station 100.

In a normal cellular system, the base station 100 transmits the common control channels such as Synchronization Channel (SCH) and Broadcast Channel (BCH) within the whole coverage area of the base station 100. The base station 100 also has to receive the uplink access channel (Random Access Channel (RACH)) transmitted within the coverage area. In the communication system using the beamforming technology as shown in FIG. 1, the base station 100 has to transmit the above channels in every available direction at least once in the above-described beam sweeping manner to transmit the SCH and BCH within the whole coverage area of the base station 100. Also, in order to receive the uplink access channels transmitted within the whole coverage area of the base station 100, the base station 100 has to make a trial to receive the uplink access channel in every available direction at least once in the beam sweeping manner.

DISCLOSURE OF INVENTION

Technical Problem

The present invention has been proposed to solve the above problem and aims to provide a random access method and apparatus for selecting a beam efficiently.

Solution to Problem

In accordance with an aspect of the present invention, an uplink access method of a mobile station includes receiving a synchronization channel and a broadcast control channel from a base station, selecting a transmission beam for transmitting an uplink access signal based on a result of receiving at least one of the synchronization channel and broadcast control channel, transmitting the uplink access signal using the selected transmission beam, and receiving an access response and a control channel initial configuration information from the base station in response to the uplink access signal.

In accordance with an aspect of the present invention, a connection configuration method of a mobile station includes receiving an access response and control channel initial configuration information, transmitting an uplink control channel based on the control channel initial configuration information, transmitting a connection request message based on scheduling information included in the received access response, and receiving a contention resolution and connection configuration information.

In accordance with another aspect of the present invention, a mobile station for performing uplink access includes a communication unit which receives a synchronization channel, a broadcast control channel, and a second reference signal and a control unit which selects a transmission beam for transmitting an uplink access signal based on a result of receiving synchronization signal, the broadcast control channel, and the second reference signal. The communication unit transmits the uplink access signal through the selected transmission beam and receives an access response and control channel initial configuration information from the base station in response to the uplink access signal.

In accordance with an aspect of the present invention, a mobile station includes a communication unit which receives an access response and control channel initial configuration information, transmits an uplink control channel based on the received control channel initial configuration information, transmits a connection request message based on scheduling information included in the received access response, and receives a contention resolution and connection configuration message from a base station.

In accordance with another aspect of the present invention, an uplink access response method of a base station includes receiving an uplink access signal from a mobile station, acquiring a best downlink transmission beam indicator from the uplink access signal, and transmitting a response signal through a downlink transmission beam indicated by the downlink transmission beam indicator.

In accordance with another aspect of the present invention, a base station for performing uplink access response includes a communication unit which receives an uplink access signal from a mobile station and a control unit which acquires a downlink transmission beam indicator from the uplink access signal. The communication unit transmits a response signal and control channel initial configuration information through a downlink transmission beam indicated by the downlink transmission beam indicator.

In accordance with another aspect of the present invention, a connection configuration method of a base station includes receiving an uplink control channel and a connection request message from a mobile station and transmitting a contention resolution and connection configuration message.

In accordance with still another aspect of the present invention, a base station for perform uplink configuration includes a communication unit which receives an uplink control channel and a connection request message and transmits a contention resolution and connection configuration message.

Advantageous Effects of Invention

The random access method and apparatus of the present invention is advantageous in terms of selecting a beam efficiently in the uplink access procedure.

BRIEF DESCRIPTION OF DRAWINGS

FIG. 7a is a diagram illustrating the procedure of exchanging response signals corresponding to the UL access signals transmitted/received between the base station 401 and the mobile station 405.

MODE FOR THE INVENTION

Figure 1:
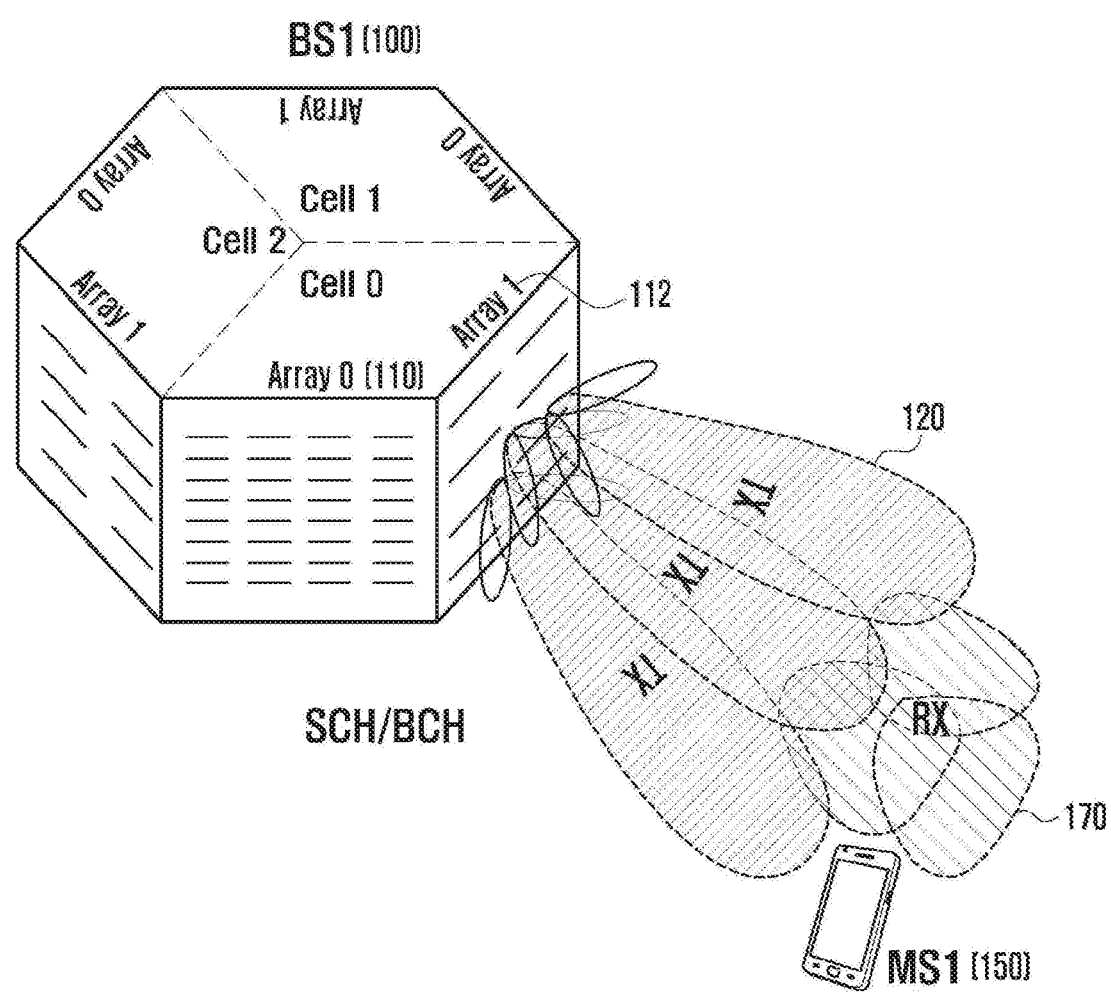
FIG. 1 is a diagram illustrating a base station 100 and a mobile station 150 supporting the beamforming with array antennas.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Descriptions are made of the uplink access method and apparatus according to embodiments of the present invention hereinafter with reference to accompanying drawings.

A number of times of transmission/reception operations for transmitting the synchronization channel and broadcast channel and receiving the uplink access channel in the beam sweeping manner is in proportion to the number of transmission and reception beams present in the coverage of the base station. Accordingly, the simplest method of reducing the transmission/reception overhead of the broadcast type channels and access channel is to support the whole coverage area of the base station with a smaller number of the transmission and reception beams. In order to achieve this, it is necessary to widen the beam width of each of the transmission and reception beams. For example, in order to cover a 60 degree sector with two transmission or reception beams, each of the transmission and reception beams has to be formed with a beam width of 30 degree.

However, as the beam width is widened, the beamforming effect decreases in inversely proportion to the beam width. That is, the beamforming effect increases as the beam width decreases. If the beam width is decreased to increase the beamforming effect, the number of transmission and reception beams necessary for covering the service area of the base station increases proportionally so as to increase the broadcast type channel transmission overhead. That is, the beamforming effect and the broadcast channel transmission overhead have a trade-off relationship.

In order to overcome this problem effectively, it can be considered to diversify the beam width for use in transmitting the broadcast channel and receiving the access channel and the beam width for use in transmitting/receiving user data. For example, it is possible to use the transmission beam with the beam width of 30 degree for the broadcast channels and the transmission beam with the beam width of 10 degree for the user data in the 60 degree sector. In the case of using multiple beam widths as in the above example, the transmission beam having a relatively wide beam width is called wide beam or coarse beam. In contrast, the transmission beam having a relatively narrow beam width is called narrow beam or fine beam.

In order to start data transmission/reception in the beamforming system using multiple beam widths, a procedure of transmitting the synchronization channel and the broadcast channel using the wide beam first. Through the uplink access procedure with the wide beam, the beast transmission and reception beams are selected among the wide beams (wide beam selection procedure). Afterward, a narrow beam for use in data communication is selected finally through a procedure of selecting the best narrow beam (narrow beam selection procedure). The procedure of determining the beam for use in data communication through the two beam selection processes causes data channel configuration delay and increases system complexity due to the use of different beam widths in transmitting/receiving signals.

The present invention proposes an efficient beam selection procedure for the transmitter and receiver to configure a communication channel in the system operating based on beamforming with multiple beam widths.

Also, the present invention proposes a method for performing the uplink access procedure and connection configuration procedure efficiently using the transmission/reception beams having one or more beam widths.

Also, the present invention proposes a method for utilizing the transmission/reception beams having different beam widths for accessing signal transmission/reception through uplink access channel and for transmitting/receiving response signal to the uplink access or connection configuration message.

Also, the present invention proposes a method for transmitting the initial setup information of the uplink/downlink control channel for use in the connection setup procedure along with the access response signal after the uplink access signal transmission/reception.

Also, the present invention proposes a method for configuring new control channel information in completing channel configuration to the mobile station through the connection setup procedure.

Also, the present invention proposes a method for the mobile station to receive the synchronization channel and the broadcast control channel, which are transmitted by the base station using the wide transmission beam, and the narrow beam reference signal, which is transmitted using the narrow transmission beam, using a plurality of reception beams, and to transmit the uplink access signal efficiently using the above information.

Also, the present invention proposes a method for the mobile station to transmit the uplink access signal including the information on the beast downlink wide beam or beast downlink narrow beam group.

Also, the present invention proposes a method for the mobile station to receive an access response and transmit detailed downlink beam information and channel information additionally using the uplink transmission/reception beam information and control channel initial setup configuration information transmitted along with the access response signal.

Figure 2:
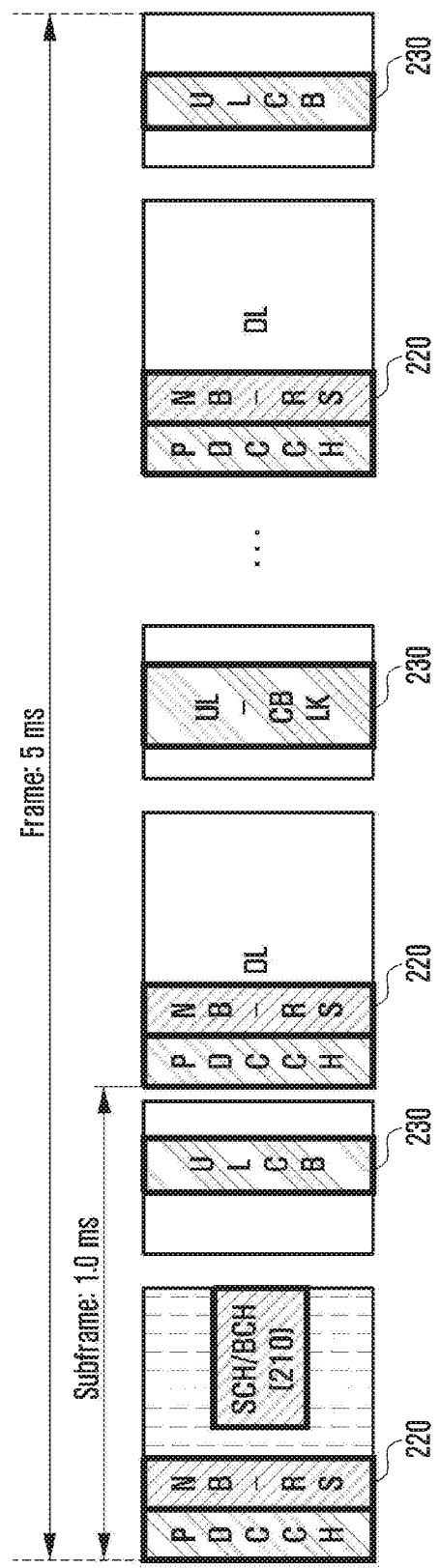
FIG. 2 is a diagram illustrating a frame structure of the communication system operating based on beamforming according to an embodiment of the present invention.

FIG. 2 is a diagram illustrating a frame structure of the communication system operating based on beamforming according to an embodiment of the present invention. Referring to FIG. 2, a frame includes a plurality of subframes that are sorted into downlink (DL) duration and uplink (UL) duration. In FIG. 2, the DL and UL durations are discrete on the time axis. According to an alternative embodiment of the present invention, the DL and UL durations may be discrete on the frequency axis. Here, part of the DL duration is defined as synchronization/broadcast channel region 210. The synchronization/broadcast channel region 210 includes a synchronization channel (SCH) region for transmitting synchronization signal between the base station and the mobile station and broadcast channel (BCH) region for broadcasting control information within the whole coverage of the base station. A part of the DL duration is defined as the duration 220 for transmitting a DL transmission narrow beam reference signal (NB-RS). In the frame structure of FIG. 2, part of the UL duration is used as UL control block 230. The UL control block 230 may carry the UL access signal, DL channel quality information, DL best narrow beam information, and DL Hybrid ARQ (HARQ) acknowledgement signal.

Figure 3:
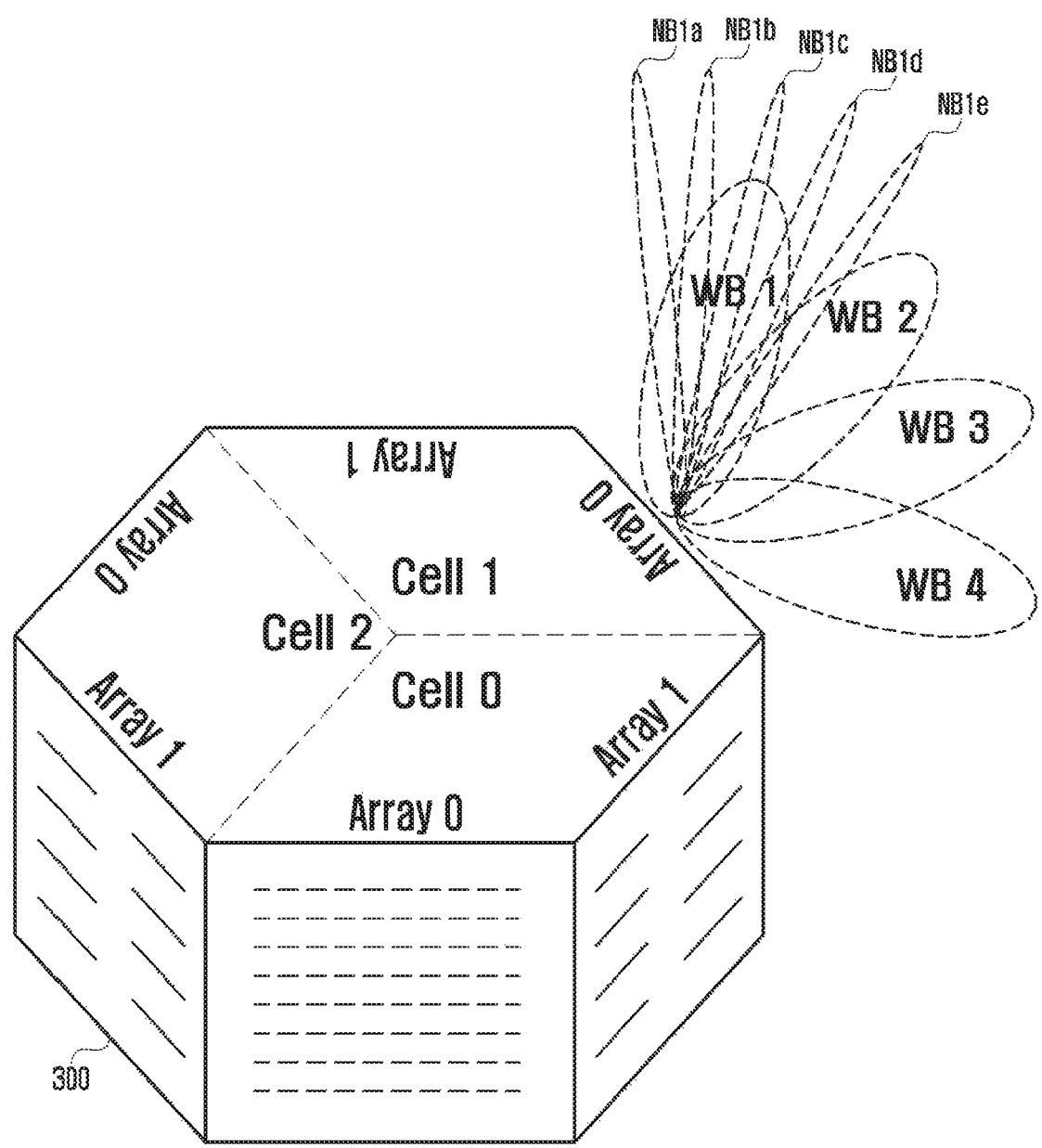
FIG. 3 is a diagram illustrating transmission and reception beams for use in channel transmission of the base station according to an embodiment of the present invention.

FIG. 3 is a diagram illustrating transmission and reception beams for use in channel transmission of the base station according to an embodiment of the present invention. According to this embodiment, the base station 300 transmit the DL synchronization channel and DL broadcast control channel using the wide beams (WB1, WB2, WB3, and WB4) having a relatively wide beam width. The base station 300 transmits the DL narrow beam reference signal (NB-RS) or DL data channel using the narrow beams (NB1a, NB1b, NB1c, NB1d, and NB1e) having a relatively narrow beam width. The base station 300 also receives the UL access signal using the wide beams (WB1, WB2, WB3, and WB4) like the DL synchronization channel and DL broadcast control channel or using the narrow beams (NB1a, NB1b, NB1c, NB1d, and NB1e) like the DL data channel. The base station 300 receives the UL data channel using the narrow beams (NB1a, NB1b, NB1c, NB1d, and NB1e) having the narrow beam with like the DL data channel.

In the embodiment of FIG. 3, the description is made under the assumption that the beam width for DL transmission of the base station is identical with the beam width for UL signal reception. According to an alternative embodiment, however, the transmission/reception beams having different beam widths may be used in downlink and uplink.

According to an embodiment of the present invention, the initial UL/DL control channel configured through the access response signal is the channel on which contention may occur between mobile stations. In the case that a plurality of mobile stations uses the same control channel, the channel may not be received correctly. In the following, a method for configuring a new contention-free control channel information in completing the channel configuration to the mobile station through the connection setup procedure.

According to an embodiment of the present invention, a base station transmits the synchronization channel and the broadcast control channel using the wide beams and the reference signal for DL narrow beam using the narrow beams and receives the UL access channels using the wide beams or narrow beams. According to an embodiment of the present invention, the base station may select a DL narrow beam or a DL wide beam for use in transmission of the response to the uplink access using the best DL wide beam information or narrow beam group information included in the UL access channel. According to an embodiment, the access response may include the best UL narrow beam information and UL/DL control channel initial setup information for use in the connection setup procedure. According to an embodiment of the present invention, the base station may configure the contention-free new control channel information in completing the channel configuration to the mobile station through the connection setup procedure.

According to an embodiment, the mobile station may receive the synchronization channel and the broadcast control channel, which are transmitted by the base station using the wide transmission beam, and the narrow beam reference signal, which is transmitted using the narrow transmission beam, using a plurality of reception beams. The mobile station may transmit the UL access signal efficiently using the above information. According to an embodiment of the present invention, the mobile station may include the best DL wide beam information or the best DL narrow beam group information in the UL access signal. According to an embodiment of the present invention, the mobile station may transmit detailed DL beam information and channel information using the UL transmission/reception beam information and the control channel initial setup information transmitted along with the access response signal after the receipt of the access response.

Figure 4A:
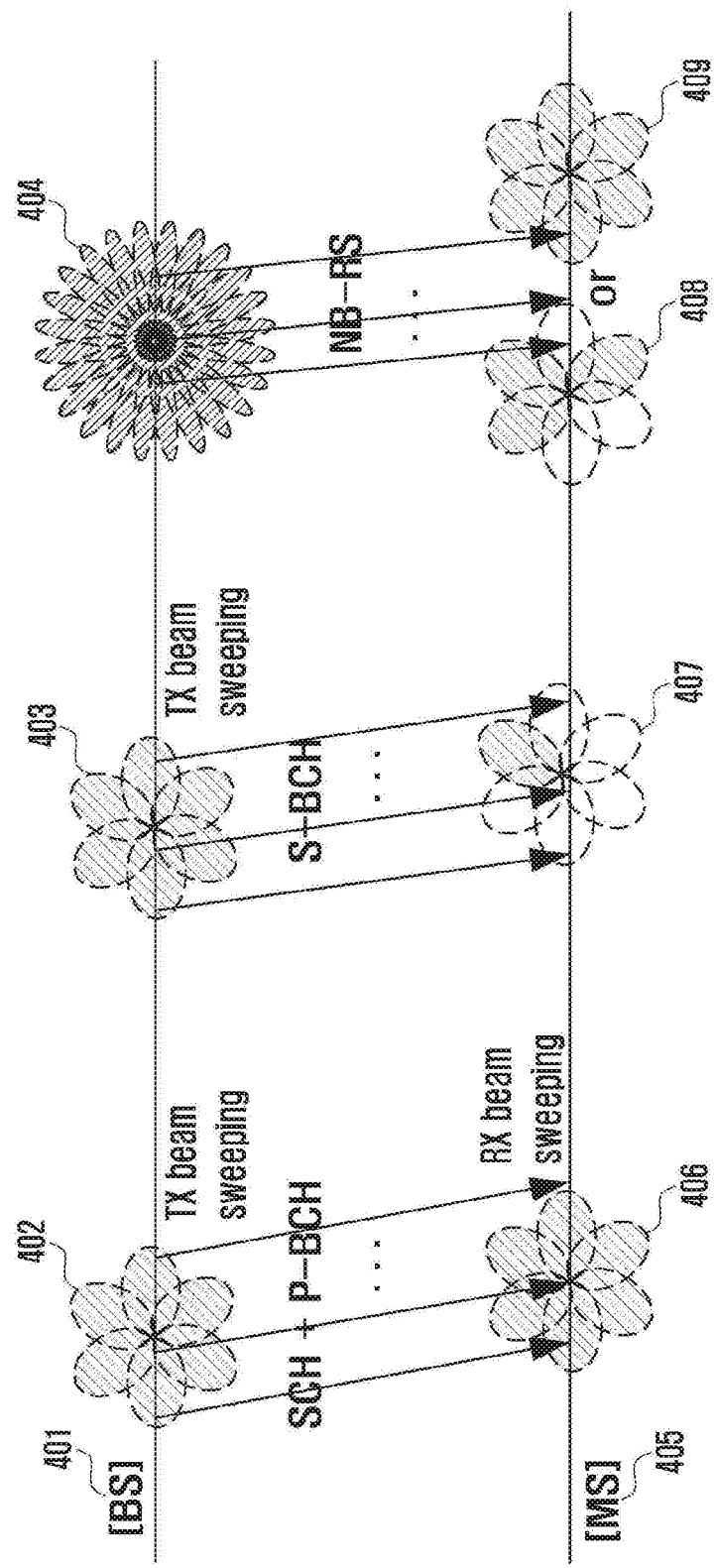
FIG. 4a is a diagram illustrating a procedure of transmitting/receiving synchronization channel, broadcast control channel, and DL narrow beam reference signal using multiple beam widths proposed in the present invention.

FIG. 4a is a diagram illustrating a procedure of transmitting/receiving synchronization channel, broadcast control channel, and DL narrow beam reference signal using multiple beam widths proposed in the present invention.

Referring to FIG. 4a, the base station 401 transmits the SCH and Primary BCH (P-BCH) a plurality of times repeatedly using a plurality of wide transmission beams within the whole coverage area of the base station at step 402. The base station 401 transmits a Secondary BCH (S-BCH) a plurality of times repeatedly using a plurality of transmission beams within the whole coverage area of the base station at step 403. The base station 401 also transmits the narrow beam reference signal (NB-RS) a plurality number of times repeatedly using a plurality of narrow transmission beams within the coverage area of the base station. Here, the P-BCH and S-BCH is referred integrally to as Broadcast control Channel (BCH).

In the procedure of FIG. 4a, the mobile station 405 attempts to receive the SCH using a plurality of reception beams to establish synchronization with the base station. The mobile station 405 also attempts to receive the P-BCH using a plurality of reception beams. The mobile station 405 also attempts to receive the S-BCH to acquire system information at step 407. The mobile station 405 determines the per-reception beam reception performances of the SCH and BCH transmitted with the wide beams in the course of attempting receipt of the SCH and BCH using the plural reception beams at step 406. Through this procedure, the mobile station 405 is capable of selecting the best DL wide transmission beam among the wide transmission beams and the best reception beam associated with the best DL wide transmission beam. The mobile station 405 may receive the S-BCH transmitted by the base station 401 using the selected best reception beam at step 406.

Afterward, the mobile station 405 attempts to receive the NB-RS, which the base station 401 transmits with the narrow beams as denoted at step 404, using a plurality of reception beams as denoted at steps 408 or 409. The mobile station 405 may attempt to receive the NB-RS at least once using all reception beams at step 409. The mobile station 405 also may attempt to receive the NB-RS using part of the reception beams that show relatively good reception performances based on the wide beam reception performances measured in the procedure of receiving the SCH and BCH at step 408. Steps 408 and 408 may be performed selectively. Upon receipt of the NB-RS transmitted by the base station 401, the mobile station 405 is capable of selecting the best narrow transmission beam among the narrow beams and the best reception beam associated therewith based on the NB-RS reception performance.

Figure 4B:
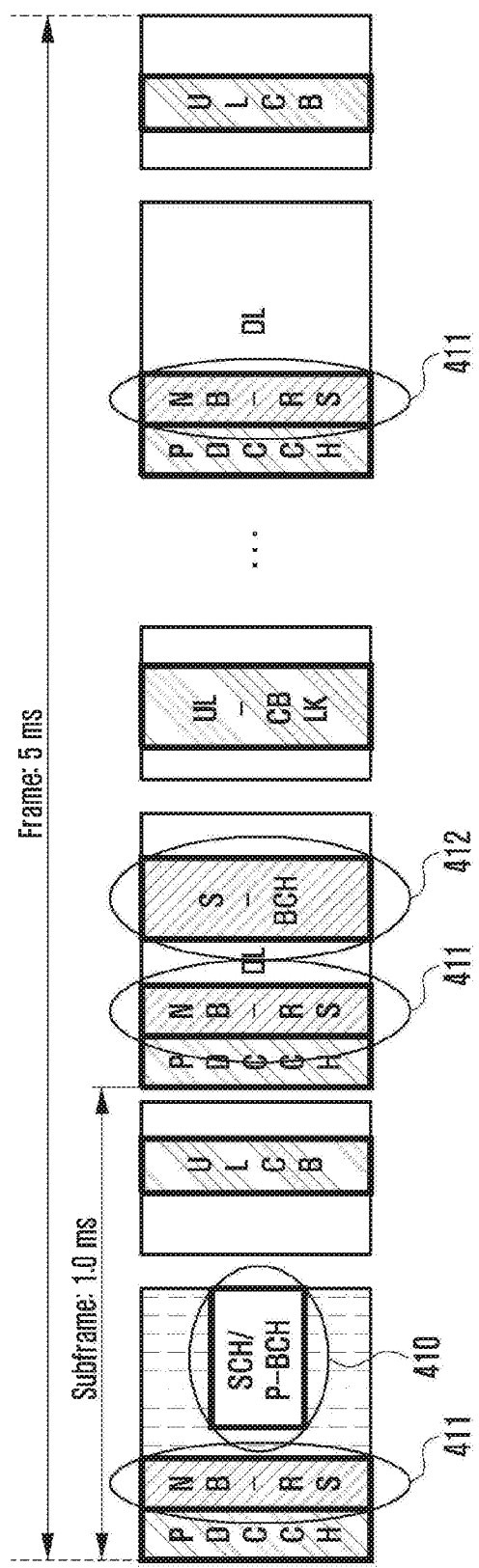
FIG. 4b is a diagram illustrating a frame structure used by the base station operating with a plurality of beam width according to an embodiment of the present invention.

FIG. 4b is a diagram illustrating a frame structure used by the base station operating with a plurality of beam width according to an embodiment of the present invention.

The SCH and P-BCH transmitted using the wide transmission beam at step 402 of FIG. 4a may be mapped to the SCH/P-BCH region 401 predetermined between the base station and the mobile station in the frame structure of FIG. 4b.

Also, the S-BCH transmitted using the wide transmission beam at step 403 of FIG. 4a may be mapped to the S-BCH region 412 in the frame structure of FIG. 4b. The S-BCH region 412 may be predetermined between the base station 401 and the mobile station 405 or informed through dynamic scheduling of the base station. In the case that the location of the S-BCH region 412 is determined dynamically, the corresponding information may be transmitted to the mobile station 405 through the P-BCH of the SCH/P-BCH region 410 or the scheduling channel (PDCCH). The NB-RS transmitted with a plurality of narrow transmission beams at step 404 of FIG. 4a may be mapped to the NB-RS region 411 in the frame structure of FIG. 4b. The NB-RS region 411 is the region in a subframe predetermined between the base station 401 and mobile station 405 or informed through dynamic scheduling. In the case that the location of the NB-RS region 411 is determined dynamically, the corresponding information may be transmitted to the mobile station 405 through the BCH of the SCH/P-BCH region 410 or the S-BCH region 412.

Figure 5A:
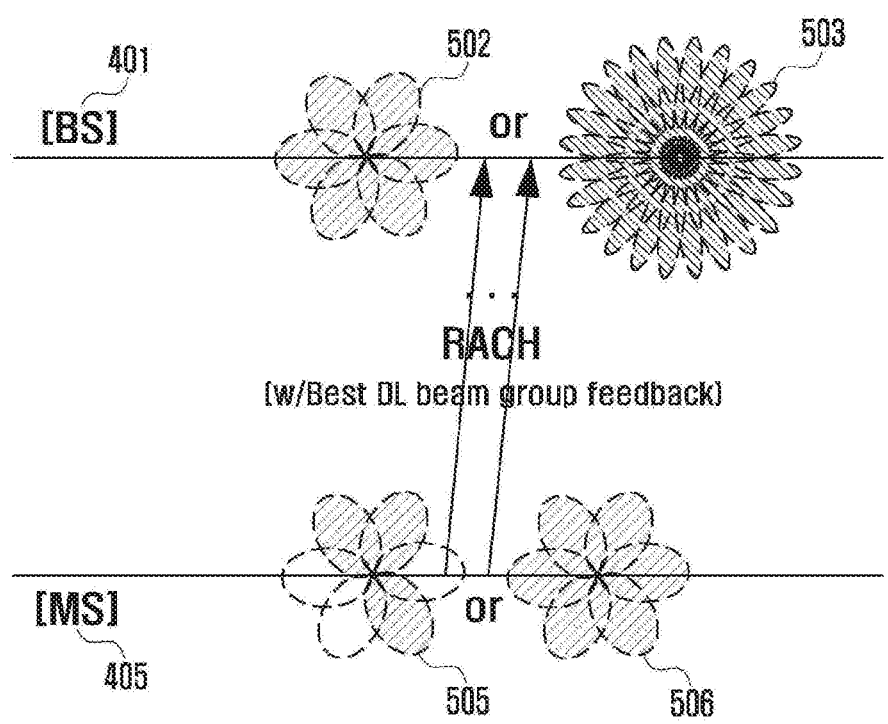
FIG. 5a is a diagram illustrating a procedure of transmitting/receiving the UL access signal according to an embodiment of the present invention.

FIG. 5a is a diagram illustrating a procedure of transmitting/receiving the UL access signal according to an embodiment of the present invention. The procedure of FIG. 5a may follow the procedure of FIG. 4a.

Figure 5B:
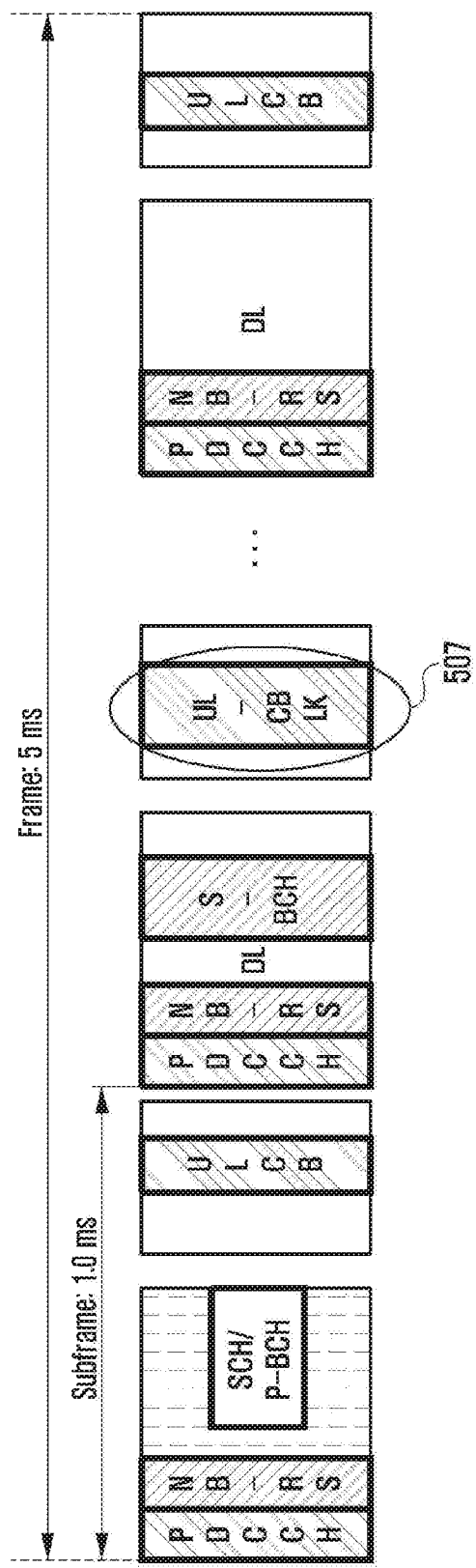
FIG. 5b is a diagram illustrating a frame structure used by the base station operating with a plurality of beam width according to an embodiment of the present invention.

FIG. 5b is a diagram illustrating a frame structure used by the base station operating with a plurality of beam width according to an embodiment of the present invention.

Referring to FIG. 5a, the base station 401 attempts to receive the UL access signal through a UL control block (UL-CBLK) 507 as a resource region reserved in the frame structure using a plurality of reception beams at step 502. Alternatively, the base station may attempt to receive the UL access signal using a plurality of narrow reception beams at step 503. Steps 502 and 503 may be performed selectively.

In the embodiment of FIG. 5a, the base station 401 which has attempted to receive the UL access signal using the plural wide reception beams or narrow reception beams may determines the best transmission beam in uplink and the best wide reception beam or the best narrow reception beam associated therewith based on the reception performance of the UL access signal received in diverse directions.

In the embodiment of FIG. 5a, the mobile station 405 transmits the uplink access signal through the uplink control block 507 using one or more transmission beams in one or more reception beams directions repeatedly at step 505 or 506. At step 506, the mobile station 405 may user all available transmission beams. The mobile station 405 may use only some transmission beams selected among the available transmission beams at step 505. Steps 505 and 506 may be performed selectively. In order to determine the uplink transmission beam for use in UL access and the corresponding reception beam at steps 505 and 506, the best DL wide transmission beam and narrow transmission beam selected in the procedure of FIG. 4a and the information on the reception beam associated therewith. In this embodiment, the mobile station 405 transmits the UL access signal including the best DL wide transmission beam indication information or best DL narrow transmission beam group indication information repeatedly.

The UL-CBLK region 507 for transmission of the UL access signal of the mobile station 405 at step 505 or 506 may be predetermined between the base station 401 and mobile station 405 or indicated through dynamic scheduling.

Figure 6:
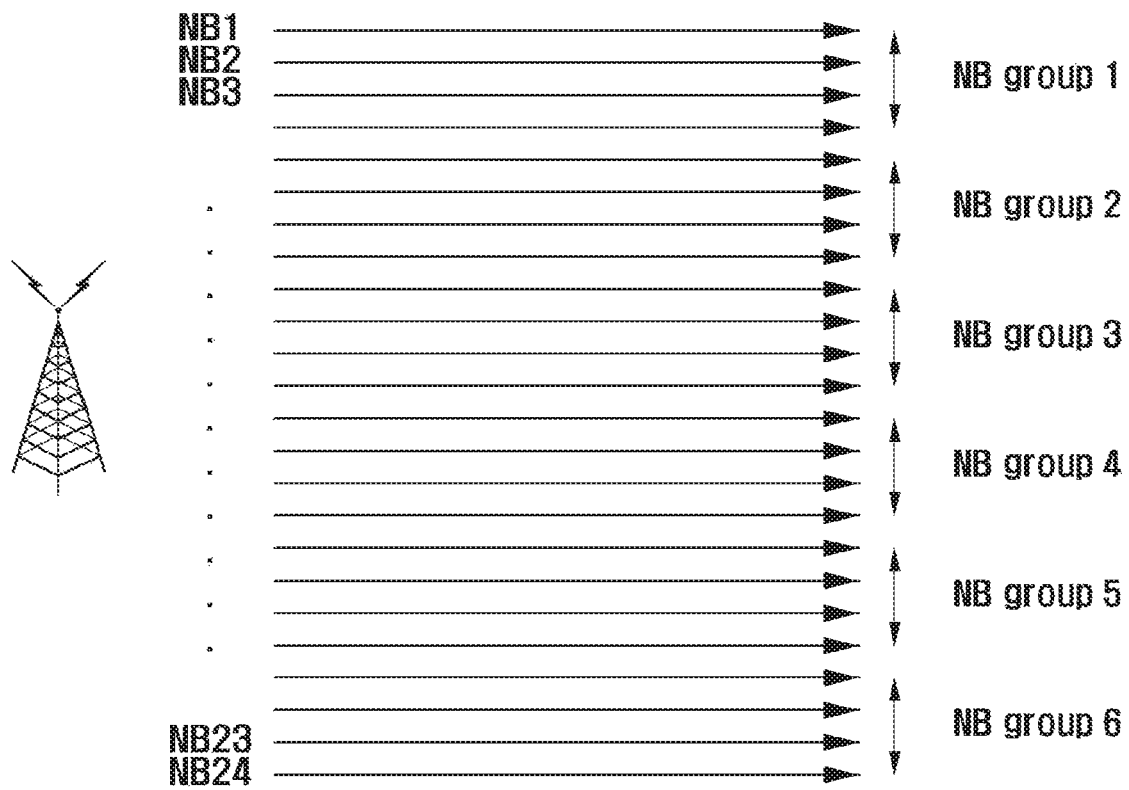
FIG. 6 is a diagram illustrating a frame structure carrying the narrow transmission beam group information according to an embodiment of the present invention.

FIG. 6 is a diagram illustrating a frame structure carrying the narrow transmission beam group information according to an embodiment of the present invention. In the embodiment of FIG. 6, the narrow beams (NB1~NB24) are grouped into several groups (NB group 1~NB group 6). This makes it possible to reduce the overhead caused by exchanging the narrow transmission beam (NB1~NB24) indication information. In the embodiment of FIG. 6, the 24 available narrow beams (NB1~NB 24) are sorted into 6 groups of 4 each (NB group 1~NB group 6). The detailed information on the narrow beam groups (NB group 1~NB group 6) may be shared in advance between the base station 401 and the mobile station 405 through the DL BCH 410 or 412 of FIGS. 4a and 4b.

FIG. 7a is a diagram illustrating the procedure of exchanging response signals corresponding to the UL access signals transmitted/received between the base station 401 and the mobile station 405.

Figure 7B:
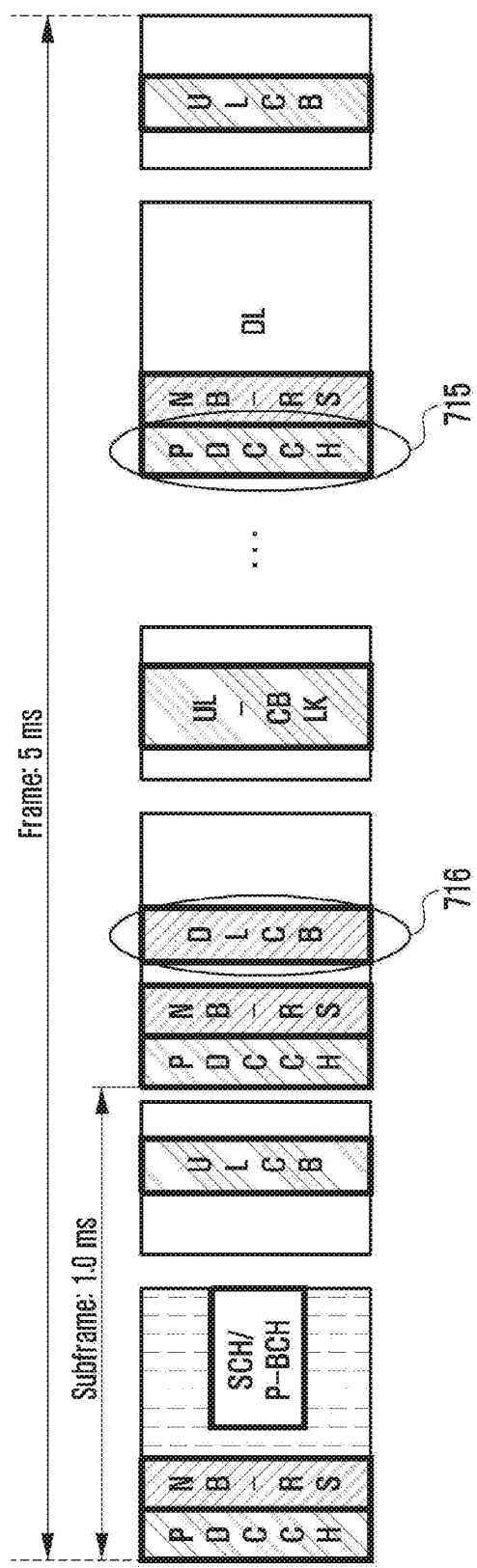
FIG. 7b is a diagram illustrating a frame structure having a resource region for transmitting/receiving the access response signal according to an embodiment of the present invention.

FIG. 7b is a diagram illustrating a frame structure including the resource region for transmitting/receiving the access response signal according to an embodiment of the present invention.

In the procedure of FIG. 5a, the base station 401 receives the access signal which the mobile station 405 transmits one or more times. Upon receipt of the access signal, the base station 401 may determine the at least one DL narrow transmission beam or DL wide transmission beam to be use for transmitting a response signal in response to the access signal at step 702 or 703 based on the best DL transmission beam indication information or the best DL narrow transmission beam group indication information included in the access signal.

In the case that a group of narrow beams are defined as shown in FIG. 6, the base station 401 may receive the best narrow transmission beam group indication information. Upon receipt of the best narrow transmission beam group indication information, the base station 401 may select at least one narrow beam among the narrow beams belonging to the corresponding group to transmit the response signal in reply to the UL uplink signal at step 702. According to an alternative embodiment, the base station 401 may select the DL wide transmission beam corresponding to the narrow transmission beam group based on the received best narrow transmission beam group indication information to transmit the response signal to the mobile station 405 in reply to the UL access signal at step 703. Steps 702 and 703 may be performed selectively.

According to an alternative embodiment of the present invention, the base station 401 may determine the scope of the DL narrow transmission beam to be used for transmitting the response signal in reply to the access signal based on the best DL wide transmission beam indication information. In order to accomplish this, there has to a relationship of 1:n between the wide and narrow transmission beams in this embodiment. The simple method for defining such relationship is to map one wide transmission beam and all the narrow transmission beams transmitted on the region (or direction) in which the wide transmission beam is transmitted. For example, the relationship between the wide transmission beam (WB1) and all the narrow transmission beams (NB1a, NB1b, NB1c, NB1d, and NB1e) transmitted in the same direction may be defined. In the example of FIG. 3, such relationship may be defined between the wide transmission beam (WB2) and narrow transmission beams (NB2a~NB2e), between the wide transmission beam (WB3) and narrow transmission beams (NB3a~NB3e), and between the wide transmission beam (WB4) and narrow transmission beams (NB4a~NB4e), respectively. The narrow transmission beams NB2a~NB2e, NB3a~NB3e, and NB4a~NB4e are omitted in FIG. 3.

In this embodiment, upon receipt of the best wide transmission beam indication information, the base station 401 may select at least one narrow transmission beam among the narrow transmission beams corresponding to the wide transmission beam to send the mobile station 405 the response signal in reply to the UL access signal. According to an alternative embodiment of the present invention, upon receipt of the best DL wide transmission beam information, the base station 401 may send the mobile station 405 the response signal in reply to the access signal using the best DL wide transmission beam.

The access response signal transmitted at steps 702 or 703 of FIG. 71 includes a Temporary ID (TID) to be used in the procedure of the access of the mobile station 405, information on the best UL transmission beam determined in the procedure of FIG. 5a, control channel initial setup information to be used in the channel configuration procedure following the access response procedure, and scheduling information on the resource for use in the channel configuration procedure, or at least part of them. The whole or part of the information may be transmitted separately but along with or with the access response signal.

In this embodiment, the initial UL/DL control channel configured through the access response signal or a separate signal is the channel on which contention may occur among plural Mobile stations. In the case that the plural Mobile stations use the same control channel, the channel may not be received correctly.

At step 707 of FIG. 7a, the mobile station 405 attempts to receive the DL access response signal transmitted using at least one DL narrow transmission beam or the best DL wide transmission beam. At step 707, the mobile station may receive the DL access response signal using the best reception beam determined through the procedure of FIG. 4a. In the above procedure, the mobile station 405 is capable of improving the access response signal reception performance by receiving the DL access response signal more than once and combining the DL access response signals.

In this embodiment, upon receipt of the access response signal, the mobile station 405 may send the base station the control signal periodically or non-periodically through the control channel configured based on the control channel setup information included in or transmitted separately of the access response signal. The control signal may include the information on the DL narrow transmission beams including the DL best narrow transmission beam, Channel Status Information (CSI) of the DL narrow transmission beams, UL Sounding Reference Signal (SRS), and HARQ response signal for UL/DL data communication.

At step 7089 of FIG. 7a, the mobile station 405 may transmit the DL best narrow transmission beam (best beam) information and DL transmission beam CSIs through the UL transmission beam corresponding to the best UL transmission beam information received at step 707 on the resource region configured based on the control channel setup information received at step 707. At step 709, the mobile station 405 may send the base station 401 the reference signal for UL channel in the resource region for UL SRS among the control channel configuration informations received at step 707. The UL SRS transmitted by the mobile station 405 at step 709 is the signal for use in determining the best combination among the UL transmission-reception beam combinations and measuring the reception performance on the transmission-reception beam combination. The mobile station 405 and the base station 401 have to transmit and receive the corresponding signal more than once on the transmission-reception beam combination.

At step 704 of FIG. 7a, the base station 401 may receive the UL control channel, which the mobile station has transmitted in the resource region configured based on the control channel configuration information transmitted at step 702 or 703, using the best UL narrow reception beam determined through the procedure of FIG. 5a or its neighboring reception beams. At step 705, the base station 401 may attempt to receive part of the control channel transmitted by the mobile station 405 using all the narrow reception beams as at step 704. According to an alternative embodiment, at step 704 or 705, the base station 401 may attempt to receive the UL control channels transmitted by the mobile station using the best wide reception beam determined through the procedure of FIG. 5a.

FIG. 7b is a diagram illustrating a frame structure having a resource region for transmitting/receiving the access response signal according to an embodiment of the present invention. The access response signal may be transmitted on the DL scheduling region 715 of FIG. 7b or the resource region 716 reserved for the DL control signal region (DL control block; DL CB). Its transmission time may be determined in consideration of the UL access signal reception time or in a time window predetermined in consideration of the access signal transmission. The resource region for transmitting/receiving the access response or the transmission/reception time information may be shared between the base station 401 and the mobile station 405 through the DL BCH 410 or 412 of FIGS. 4a and 4b.

Figure 8A:
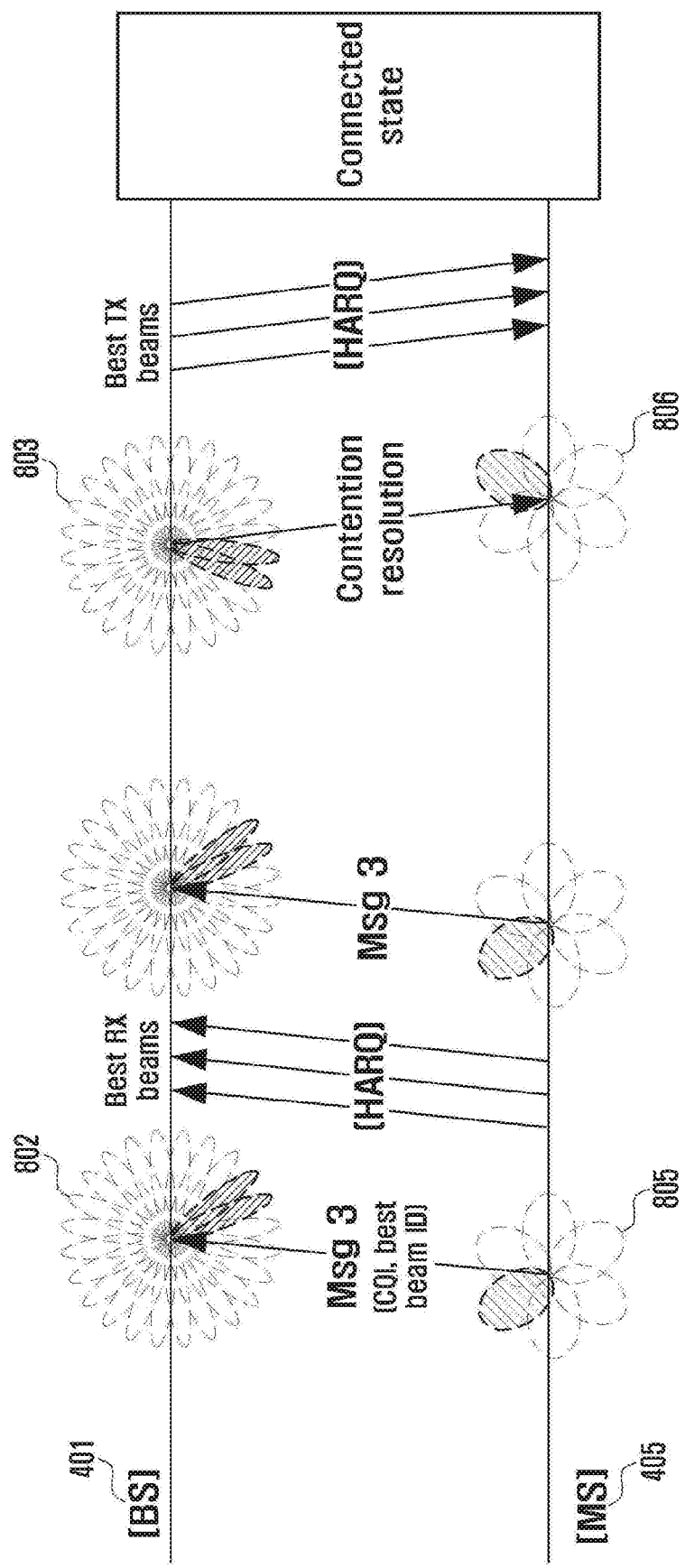
FIG. 8a is a diagram illustrating a procedure of establishing a connection based on the information exchanged between the base station 401 and the mobile station 405 in the access procedure.

FIG. 8a is a diagram illustrating a procedure of establishing a connection based on the information exchanged between the base station 401 and the mobile station 405 in the access procedure.

As described with reference to FIG. 7a, the mobile station 401 receives the best UL transmission beam information and UL message transmission resource scheduling information through the procedure of exchanging the access response signal. Afterward, the mobile station 401 transmits a connection request message for connection establishment after the access using the corresponding transmission beam on the corresponding resource region at step 805. In this embodiment, the mobile station 405 transmits the connection request message including information on the best DL narrow transmission beam determined through the procedure of 4a and the transmission beam reception performance information or part of the information. The connection request message including the best DL narrow transmission beam and the transmission beam reception performance information or part of the information may be transmitted to the base station 401 one or more times based on the Hybrid Automatic Retransmit Request (HARQ) technique. The mobile station 405 may receive a HARQ feedback in a predetermined DL resource region corresponding to the UL resource region on which the connection request message is transmitted or in the resource region corresponding to the DL control channel configuration information received along with the access response signal of FIG. 7a.

As described above, the base station 401 schedules the resource for UL message transmission in the access response signal transmission/reception procedure of FIG. 7a.

Afterward, the base station 401 receives the UL connection request message in the corresponding resource region at step 802. At this time, the best UL narrow reception beam determined in the procedure of FIG. 5a or its neighbor reception beams. According to an alternative embodiment, the base station 401 may receive the UL connection request message transmitted by the mobile station using the best wide reception beam determined in the procedure of FIG. 5a. The UL connection request message may include the information on the best DL narrow transmission beam and the reception performance of the transmission beam, and the base station 401 may determine the best DL narrow transmission beam and the reception performance of the transmission beam based on the UL connection request message. The connection request message may transmitted/received more than once repeatedly through the HARQ process, and the HARQ feedback may be transmitted in a predetermined DL resource region corresponding to the UL resource region in which the UE 405 has transmitted the message or in the resource region corresponding to the DL control channel configuration information which the base station has transmitted along with the access response signal of FIG. 7a.

Upon receipt of the UL connection request message, the base station 401 performs a contention resolution procedure for resolving the contention among the Mobile stations at step 803 to complete the connection setup procedure. The base station 401 may select the mobile station 405 allowed for access finally among the plural Mobile stations through the contention resolution procedure and send the mobile station 405 the physical layer, MAC layer, and the serving configuration information. The physical layer and MAC layer configuration information may include contention-free new control channel information.

The message transmitted by the base station 401 for the contention resolution procedure at step 803 may be transmitted through the DL narrow transmission beam selected based on the best DL narrow transmission beam indication information the reception performance information of the transmission beam that are received along with the connection request message. The base station 401 may send the mobile station 405 the message using the narrow transmission beam selected based on the UL control channel information received in the procedure of FIG. 7a. The message for the contention resolution procedure may be transmitted/received more than once repeatedly using the HARQ technique.

The mobile station 405 may be allowed finally for access through the convention resolution procedure at step 806. The mobile station 405 may set up the connection based on the physical layer, MAC layer, and serving configuration information to enter the connected state. The physical layer and MAC layer configuration information may include new contention free control channel information. The message for the contention resolution procedure may be transmitted/received more than once repeatedly using the HARQ technique. The HARQ feedback may be transmitted in a predetermined UL resource region corresponding to the DL resource region in which the message has been transmitted or in the resource region corresponding to the UL control channel information received along with the access response signal of FIG. 7a.

Figure 8B:
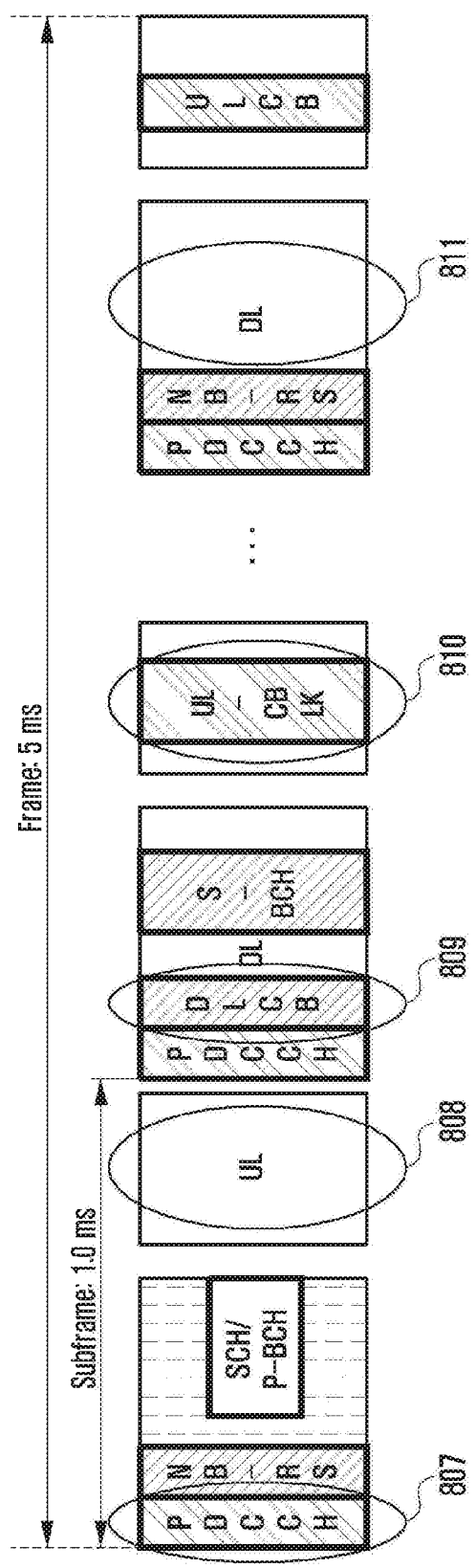
FIG. 8b is a diagram illustrating a frame structure including the resource for use in the procedure of FIG. 8.

FIG. 8b is a diagram illustrating a frame structure including the resource for use in the procedure of FIG. 8a. The frame includes a PDCCH region 807, an UL region 808, a DL region 811, a UL control block 810, and a DL control block 809.

Figure 9:
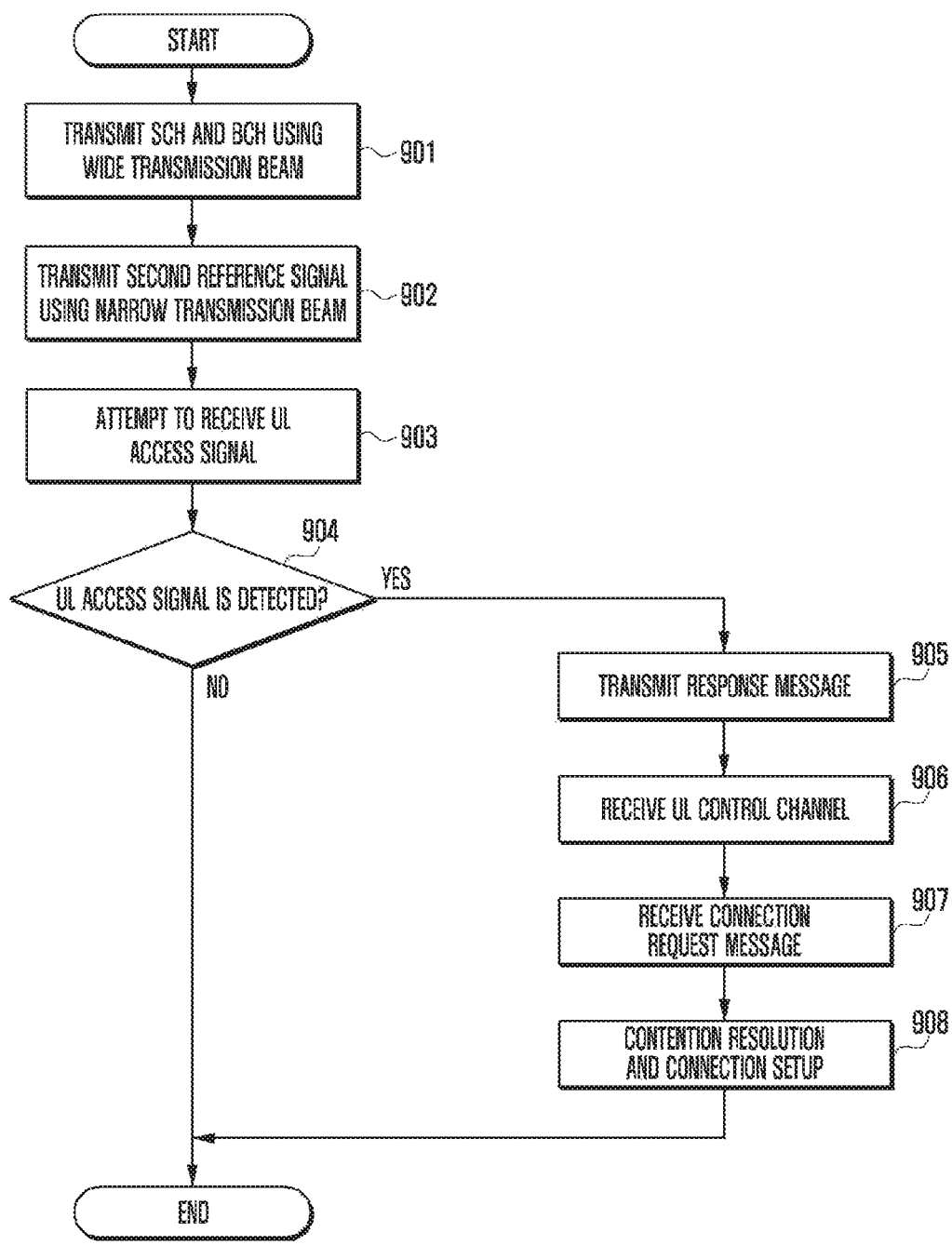
FIG. 9 is a flowchart illustrating the access response procedure of the base station 401 according to an embodiment of the present invention.

FIG. 9 is a flowchart illustrating the access response procedure of the base station 401 according to an embodiment of the present invention. At step 901, the base station 401 transmits the SCH and BCH on every wide transmission beam at least once using at least one wide transmission beam as described with reference to FIG. 4a. The information transmitted on the BCH may include P-BCH and S-BCH transmission time and resource information, DL NB-RS transmission time and resource information, information on the resource reserved for UL access signal transmission, access response signal transmission time and resource information, and other UL/DL control single region configuration information.

At step 902, the base station 401 transmits the second reference signal (NB-RS) on the DL narrow transmission beam at the transmission time notified through the BCH at step 901 as described with reference to FIG. 4a. The reference signal transmitted on the narrow transmission beam is referred to as second reference signal. However, the claims of the present invention are not limited thereto. At step 903, the base station 401 attempts to receive the UL access signal transmitted by the mobile station 405 using at least one wide reception beam or narrow reception beam as described with reference to FIG. 4a.

At step 904, the base station 401 determines whether an UL access signal is detected. If the UL access signal is not detected, steps 905 to 908 are skipped. If the access signal is detected, the base station 401 determines at least one DL narrow transmission beam or DL wide transmission beam to be used for transmitting the access response signal based on the best DL wide transmission beam information or best DL narrow transmission beam group information included in the UL access signal and transmits the access response signal using the determined transmission beam. After determining the transmission beam to be used for transmitting the access response signal, the base station 401 transmits the access response signal using the transmission beam at step 905. The access response signal may include a Temporary ID (TID) to be used in the procedure subsequent to the access, best uplink transmission beam information, control channel initial configuration information to be used in the channel configuration procedure following the access response procedure, and scheduling information for resource to be used in the channel configuration information, or part of them. The whole or part of the above information may be transmitted as a signal independent of the access response signal or along with or without the access response signal.

At step 906, the base station 401 attempts to receive the UL control channel transmitted by the mobile station 405 using the best UL transmission beam based on the control channel configuration information of step 905. The information transmitted through the UL control channel may include the information indicating the DL narrow transmission beams including the best DL narrow transmission beam, the Channel Status Information (CSI) of the DL narrow transmission beams, and the UL reference signal (Sounding Reference Signal). The base station 401 may determine the best DL narrow transmission beam to be used in the connection setup procedure and the reception performance of the transmission beam through the operation of step 906.

Afterward, the base station 401 may receive the connection request message transmitted by the mobile station using the HARQ technique at step 907. The base station 401 transmits a contention resolution and connection setup message in response to the connection request message using the HARQ technique at step 908 and ends the signal transmission/reception operation. The connection setup message of step 908 may include new contention free control channel setup information. The connection request message transmitted by the mobile station 405 at step 907 may include the best DL narrow transmission beam indication information and the transmission beam reception performance information. The HARQ feedback used in the HARQ operation at steps 907 and 908 may be transmitted in the predetermined UL/DL resource region corresponding to the UL/DL resource region in which the messages have been transmitted/received or in the resource region corresponding to the control channel information transmitted along with the access response signal at step 905.

Figure 10:
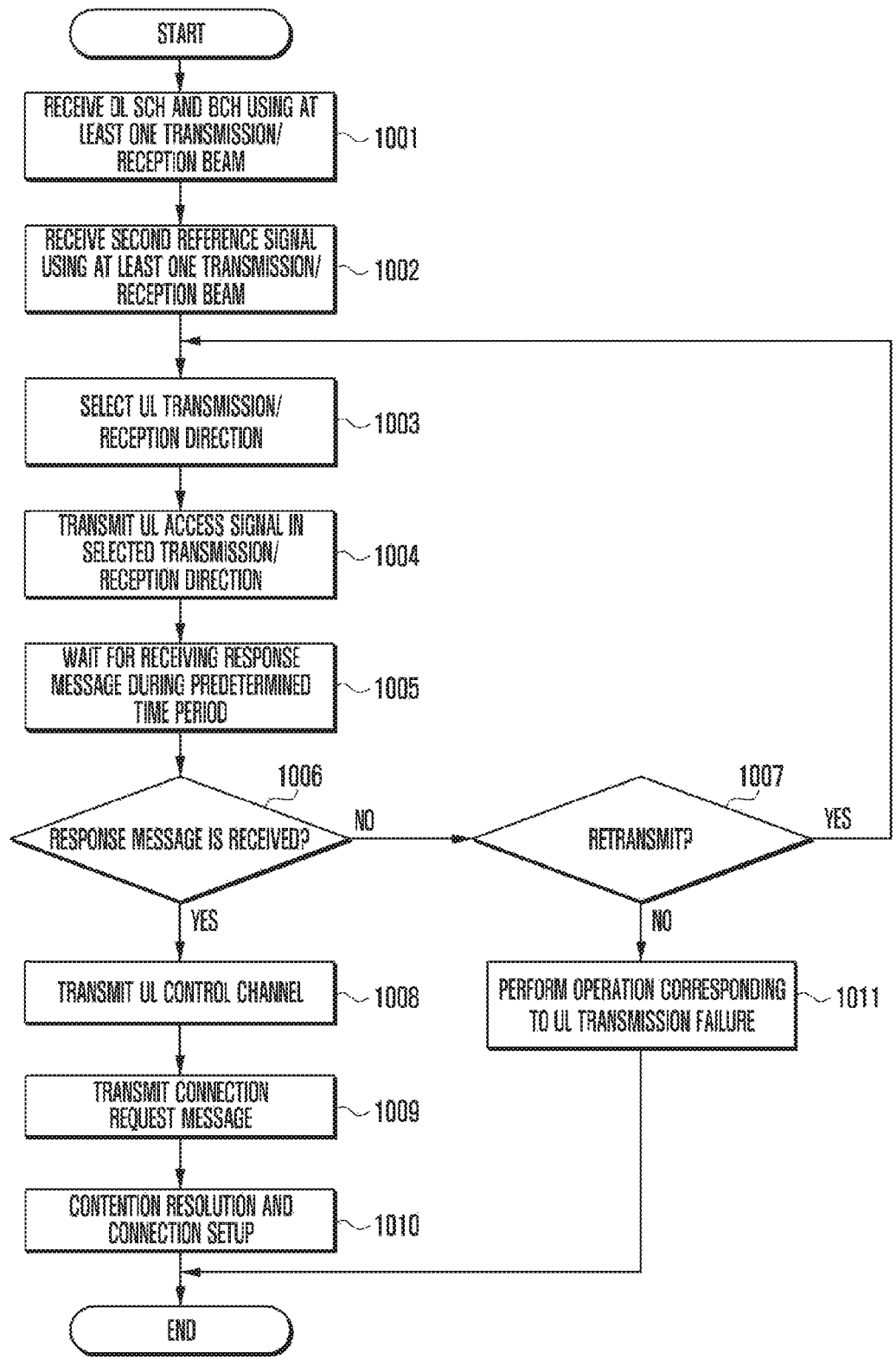
FIG. 10 is a flowchart illustrating the UL access signal transmission procedure of the mobile station 405 according to an embodiment of the present invention.

FIG. 10 is a flowchart illustrating the UL access signal transmission procedure of the mobile station 405 according to an embodiment of the present invention.

The mobile station 405 receives the DL SCH and BCH transmitted on the wide transmission beam using at least one reception beam at step 1001 as described with reference to FIG. 4a. At step 1002, the mobile station 405 receives the DL second NB-RS at the transmission time indicated through the BCH received at step 1001 as described with reference to FIG. 4a.

Next, the mobile station 405 selects the transmission beam and transmission time for transmitting the UL access signal at step 1003. For example, the mobile station 405 may select all available transmission beams. According to an alternative embodiment, the mobile station 405 may use the best DL wide transmission beam and best DL narrow transmission beam selected in the procedure of receiving the DL SCH and BCH and DL second reference signal (NB-RS) and some UL transmission beams selected based on the reception beam information corresponding to the DL beams.

Next, the mobile station 405 transmits the UL access signal using the selected UL transmission beam at step 1004. After transmitting the UL access signal, the mobile station 405 waits for the response signal of the base station in reply to the UL access signal during a predetermined waiting time period. Here, the waiting time period may be set to a value determined at step 1005 or received through the BCH at step 1001.

If the access response signal is received during the waiting time period at step 1006, the mobile station 405 determines that the UL access is succeed and starts uplink control channel transmission at step 1008 according to the control channel configuration information received along with the access response signal. The information transmitted through the UL control channel may include the information on the DL narrow transmission beams including the best DL narrow transmission beam, DL narrow transmission beams Channel Status Information (CSI), and UL reference signal (UL Sounding Reference Signal).

At step 1009, the mobile station 405 transmits the connection request message using the UL transmission beam corresponding to the best UL transmission beam information received along with the access response signal at the time and on the resource indicated in the scheduling information received along with the access response signal at step 1006, using the HARQ technique. The mobile station 405 receives the contention resolution and connection setup message transmitted by the 401 in response to the connection request message using the HARQ technique at step 1010 and ends the UL signal transmission operation. The connection request message transmitted by the mobile station 405 at step 1009 may include the information on the best DL narrow transmission beam and the reception performance of the transmission beam.

The HARQ feedback used in the HARQ operation at steps 1009 and 1010 may be transmitted in the predetermined UL/DL resource region corresponding to the UL/DL resource region in which the messages have been transmitted/received or the resource region corresponding to the control channel information received along with the access response signal at step 1006.

If the access response signal is not received at step 1006, the mobile station 405 determines whether to retransmit the UL signal transmitted according to a predetermined rule at step 1007. The determination may be made based on the information about whether to retransmit uplink signal which is received through the BCH at step 1001, UL maximum transmission power, and number of UL signal retransmission times. If it is determined to retransmit the UL signal at step 1007, the mobile station 405 returns the procedure to step 1003 to perform the operation of transmitting the UL access signal. According to an alternative embodiment, if it is determined to perform retransmission at step 1007, the mobile station 405 may return the procedure to step 1004 without selecting the transmission/reception direction again.

If it is determined to do not retransmit the UL signal according to the predetermined rule at step 1007, the mobile station 405 performs an operation for the case of UL transmission failure at step 1011 and ends the UL transmission operation. The operation for the case of UL transmission failure may include the operation of reattempting the UL signal transmission from the beginning after a time period predetermined or received in the BCH at step 1001.

Figure 11:
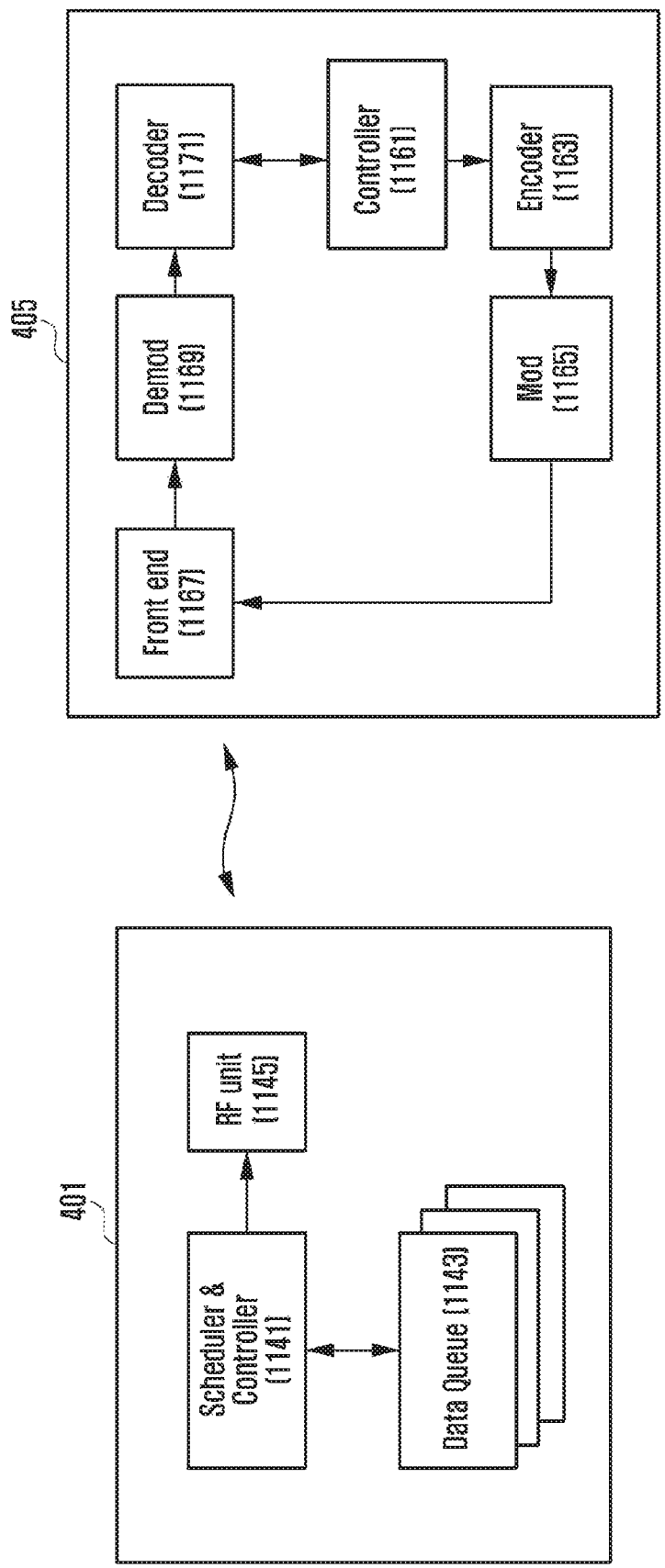
FIG. 11 is a block diagram illustrating the configurations of the base station 401 and the mobile station 405 according to an embodiment of the present invention.

FIG. 11 is a block diagram illustrating the configurations of the base station 401 and the mobile station 405 according to an embodiment of the present invention.

According to an embodiment of the present invention, the base station 401 includes a scheduler & controller 1141, a Radio Frequency (RF) unit 1145, and data queues 1143.

According to an embodiment of the present invention, the mobile station 405 includes a transceiver (Front end) 1167, a demodulator 1169, a decoder 1171, a controller 1161, an encoder 1163, and a modulator 1165.

The scheduler & controller 1141 of the base station 401 controls the RF unit 1145 according to above described embodiments. Particularly, the scheduler & controller 1141 selects an appropriate transmission/reception beam in the middle of the UL access operation according to the method of FIGS. 4a to 10. The scheduler & controller 1411 also controls the RF unit 1145 to perform communication using the selected transmission/reception beam.

The data queue 1143 of the base station 401 stores the data received from an upper network node to the queues corresponding to the respective Mobile stations or services, and the scheduler & controller 1141 controls the user-specific or queue-specific data in consideration of DL channel condition information, service characteristics, and fairness. The RF unit 1145 transmits the selectively controlled data signal or control signal to the mobile station 405. The RF unit 1145 transmits a response in response to the UL access signal of the mobile station 405 and selects transmission/reception beam to perform radio communication under the control of the scheduler & controller 1141.

The control unit 1161 of the mobile station 405 performs the UL access procedure according to the above described embodiments. The control unit 1161 controls the transceiver (front end) 1167) to acquire the best transmission/reception beam information or notify the base station 401 of the best transmission/reception beam information in the middle of the UL access procedure. The transceiver (front end) 1167 receives the radio communication signal, the demodulator 1169 demodulates the received signal, the decoder 1171 decodes the demodulated signal, and the control unit 1161 makes a decision on and processes the decoded signal. The control unit 1161 transfers the signal to be transmitted to the decoder 1163, which decodes the received signal. The decoded signal is transferred to the modulator 1165. The modulator 1165 modulates the received signal and transfers the modulated signal to the transceiver 1167. The transceiver 1167 transmits the signal to the mobile station 401 over a radio wave.

Although the description has been made with reference to particular embodiments, the present invention can be implemented with various modifications without departing from the scope of the present invention. Thus, the present invention is not limited to the particular embodiments disclosed but will include the following claims and their equivalents.

Advantages and features of the present invention and methods of accomplishing the same may be understood more readily by reference to the detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Detailed description of the present invention is made with reference to the drawings for explaining the invention with the embodiments of the present invention.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The mobile terminal according to an embodiment of the present invention is a portable electronic device such as a mobile phone, a Personal Digital Assistant (PDA), a navigation device, a digital broadcast receiver, and a Portable Multimedia Player (PMP).

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method performed by a terminal in a wireless communication system, the method comprising:
    receiving, from a base station, a plurality of common signals transmitted on a plurality of downlink transmission beams;
    selecting an uplink transmission beam for transmitting a random access preamble based on a reception result of the plurality of common signals;
    transmitting, to the base station, the random access preamble using the selected uplink transmission beam; and
    receiving, from the base station, a random access response as a response to the random access preamble.

2. The method of claim 1, wherein each of the plurality of common signals comprises at least one of a synchronization signal or a broadcast signal.

3. The method of claim 1, wherein a resource for transmitting the random access preamble is configured to be associated with a specific downlink transmission beam of the plurality of downlink transmission beams.

4. The method of claim 1, further comprising:
    receiving, from the base station, a reference signal for measuring a channel state; and
    selecting a specific downlink transmission beam based on a measurement result of the reference signal.

5. The method of claim 1, further comprising: retransmitting, to the base station, the random access preamble in case that the random access response is not received in a configured time.

6. The method of claim 1, further comprising:
    transmitting, to the base station, a first message for a connection request as a response to the random access response;
    receiving, from the base station, a second message transmitted on a downlink transmission beam corresponding the random access response is transmitted, as a response to the first message; and
    retransmitting, to the baes station, the first message or the random access preamble in case that the second message is not received in a configured time.

7. The method of claim 1, further comprising:
    selecting a specific downlink transmission beam of the plurality of downlink transmission beams based on the reception result of the plurality of common signals,
    wherein the random access response is transmitted from the base station to the terminal on the specific downlink transmission beam.

8. The method of claim 6, wherein the first message is transmitted on the uplink transmission beam.

9. The method of claim 1, wherein a control signal comprises a temporary identifier (TID) which is used in a procedure after an access, and scheduling information for a resource to be used in a channel configuration procedure.

10. The method of claim 1, wherein the selecting of the uplink transmission beam comprises:

selecting a downlink reception beam based on the reception result of the plurality of common signals; and
selecting the uplink transmission beam corresponding to the selected downlink reception beam.

11. A terminal in a wireless communication system, the terminal comprising:
  a transceiver; and
  a controller configured to:
    receive, from a base station via the transceiver, a plurality of common signals transmitted on a plurality of downlink transmission beams,
    select an uplink transmission beam for transmitting a random access preamble based on a reception result of the plurality of common signals,
    transmit, to the base station via the transceiver, the random access preamble using the selected uplink transmission beam, and
    receive, from the base station via the transceiver, a random access response as a response to the random access preamble.

12. The terminal of claim 11, wherein each of the plurality of common signals comprises at least one of a synchronization signal or a broadcast signal.

13. The terminal of claim 11, wherein a resource for transmitting the random access preamble is configured to be associated with a specific downlink transmission beam of the plurality of downlink transmission beams.

14. The terminal of claim 11, wherein the controller is further configured to:
  receive, from the base station via the transceiver, a reference signal for measuring a channel state, and
  select a specific downlink transmission beam based on a measurement result of the reference signal.

15. The terminal of claim 11, wherein the controller is further configured to: retransmit, to the base station via the transceiver, the random access preamble in case that the random access response is not received in a configured time.

16. The terminal of claim 11, wherein the controller is further configured to:
  transmit, to the base station via the transceiver, a first message for a connection request as a response to the random access response,
  receive, from the base station via the transceiver, a second message transmitted on a downlink transmission beam corresponding the random access response is transmitted, as a response to the first message, and
  retransmit, to the baes station via the transceiver, the first message or the random access preamble in case that the second message is not received in a configured time.

17. The terminal of claim 11,
  wherein the controller is further configured to select a specific downlink transmission beam of the plurality of downlink transmission beams based on the reception result of the plurality of common signals, and
  wherein the random access response is transmitted from the base station to the terminal on the specific downlink transmission beam.

18. The terminal of claim 16, wherein the first message is transmitted on the uplink transmission beam.

19. The terminal of claim 11, wherein a control signal comprises a temporary identifier (TID) which is used in a procedure after an access, and scheduling information for a resource to be used in a channel configuration procedure.

20. The terminal of claim 11, wherein the controller is further configured to:
  select a downlink reception beam based on the reception result of the plurality of common signals; and
  select the uplink transmission beam corresponding to the selected downlink reception beam.

* * * * *